US007613455B2

(12) United States Patent
Park

(10) Patent No.: US 7,613,455 B2
(45) Date of Patent: Nov. 3, 2009

(54) RESCAN METHOD AND APPARATUS OF A MOBILE TERMINAL

(75) Inventor: Young-Jae Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 242 days.

(21) Appl. No.: 10/939,483

(22) Filed: Sep. 14, 2004

(65) Prior Publication Data

US 2005/0059395 A1    Mar. 17, 2005

(30) Foreign Application Priority Data

Sep. 15, 2003    (KR) .................. 10-2003-0063764

(51) Int. Cl.
*H04Q 7/20*    (2006.01)
(52) U.S. Cl. ............... 455/434; 455/435.1; 455/435.2; 455/515; 455/516; 370/431
(58) Field of Classification Search ............... 455/434, 455/435.1, 435.2, 435.3, 515, 516; 370/431
See application file for complete search history.

(56) References Cited

U.S. PATENT DOCUMENTS

| | | | |
|---|---|---|---|
| 5,119,502 A | | 6/1992 | Kallin et al. |
| 5,794,146 A | * | 8/1998 | Sevcik et al. ............... 455/434 |
| 6,058,252 A | * | 5/2000 | Noll et al. .................... 716/10 |
| 6,075,988 A | * | 6/2000 | Anderson et al. ........... 455/434 |
| 6,282,419 B1 | | 8/2001 | Findikli ...................... 455/434 |
| 6,356,538 B1 | * | 3/2002 | Li ............................... 370/311 |
| 6,745,056 B2 | * | 6/2004 | Wang et al. ................. 455/574 |
| 7,272,132 B2 | * | 9/2007 | Kim et al. .................... 370/350 |
| 2003/0003910 A1 | | 1/2003 | McClure |
| 2003/0016702 A1 | * | 1/2003 | Bender et al. ............... 370/522 |
| 2003/0096611 A1 | * | 5/2003 | Cooper ....................... 455/434 |
| 2004/0039956 A1 | * | 2/2004 | Li ............................... 713/502 |
| 2004/0219916 A1 | * | 11/2004 | Kim et al. ................ 455/435.3 |
| 2004/0224684 A1 | * | 11/2004 | Dorsey et al. ............... 455/434 |

FOREIGN PATENT DOCUMENTS

| | | |
|---|---|---|
| KR | 00145864 | 5/1998 |
| KR | 00228302 | 8/1999 |
| WO | WO 01/47316 | 6/2001 |

* cited by examiner

*Primary Examiner*—Vincent P Harper
*Assistant Examiner*—Fred A Casca
(74) *Attorney, Agent, or Firm*—KED & Associates, LLP

(57) ABSTRACT

A rescan apparatus and method of a mobile terminal are provided that can monitor a specific slot during a rescan process. The rescan apparatus and method of the mobile terminal may allow the mobile terminal to monitor the specific slot while periodically rescanning systems. The mobile terminal may receive paging during the rescan process. In addition, the rescan apparatus and method may prevent call reception failure or message reception delay of the mobile terminal, thereby implementing efficient soft handover.

8 Claims, 4 Drawing Sheets

RESCAN METHOD AND APPARATUS OF A MOBILE TERMINAL

The present application claims priority from Korean Patent Application No. 63764/2003, filed Sep. 15, 2003, the subject matter of which is incorporated herein by reference.

BACKGROUND OF THE INVENTION

1. Field of the Invention

Embodiments of the present invention may relate to a mobile terminal. Mote particularly, embodiments of the present invention may relate to a rescan method and apparatus that can monitor a specific slot during a rescan process.

2. Background of Related Art

Rescan is a process of a mobile terminal searching and obtaining a system having a highest priority in a current area. The mobile terminal may repeatedly and periodically rescan systems until the mobile terminal determines the system having the highest priority in the corresponding area. The rescan period may depend on mobile communication providers and may range from 1 to 3 minutes, for example.

FIG. 1 is a flowchart showing operations of a rescan algorithm of a mobile terminal according to an example arrangement. A standby state terminal may start a periodic rescan in order to confirm whether a system exists that has a higher priority than the current system (S10). After starting the rescan, the mobile terminal may decide whether the current system has the highest priority in the corresponding area (S20). If the current system is not the system having the highest priority, the mobile terminal may check whether other systems to be scanned exist on a scan list (S30).

If other systems to be scanned exist on the scan list, the mobile terminal may rescan a succeeding system (S40). When finishing the rescan, the mobile terminal may confirm whether a new system has been searched (S50). If the new system has been searched, the mobile terminal may decide whether the new system has a higher priority than the current system (S60). If the new system has a higher priority than the current system, the mobile terminal may obtain the system (S70) and end the rescan (S80).

The rescan algorithm may prevent low call reception and resulting power consumption by periodically updating the current system with a system having a higher priority. However, in the rescan algorithm, if many systems need to be scanned in the rescan process, a scan time may get longer than a slot cycle length. In this case, the mobile terminal may become asynchronous from the current system. As a result, the mobile terminal may not receive paging, connect calls and/or receive messages.

SUMMARY OF THE INVENTION

Embodiments of the invention may solve at least the above problems and/or disadvantages and provide at least the advantages described hereinafter. Embodiments of the present invention may provide a rescan apparatus and method of a mobile terminal that can selectively monitor a slot or rescan systems.

A rescan apparatus of a mobile terminal may be provided that includes a calculating unit for calculating a time $T_a$ to monitor a specific slot of the mobile terminal and a time $T_b$ to rescan systems provided on a scan list of the mobile terminal. The rescan apparatus may also include a comparing unit for comparing $T_a$ with $T_b$, which are output from the calculating unit and the comparing unit may output a comparison result. A controlling unit may output a control signal to a rescanning unit or a monitoring unit according to the comparison result of the comparing unit. The rescanning unit may receive the control signal from the controlling unit and accordingly rescan the systems. The monitoring unit may receive the control signal from the controlling unit and accordingly return to the original system and monitor the specific slot.

A rescan method of a mobile terminal may include calculating a time $T_a$ to monitor a specific slot of the mobile terminal and a time $T_b$ to rescan systems recorded (or provided) on a scan list of the mobile terminal. The method may also include comparing $T_a$ with $T_b$. When $T_a$ is equal to or longer than $T_b$, then the method may involve rescanning the systems. When $T_a$ is shorter than $T_b$, the method may involve returning to the original system and monitoring the specific slot.

The controlling unit may receive the comparison result from the comparing unit and output the control signal to the rescanning unit when $T_a$ is equal to or longer than $T_b$. On the other hand, the controlling unit may output the control signal to the monitoring unit when $T_a$ is shorter than $T_b$.

The time $T_a$ to monitor the specific slot of the mobile terminal may be obtained by subtracting a current slot from a slot to be monitored by the mobile terminal. The time $T_b$ to rescan the systems on the scan list of the mobile terminal may be obtained by adding a time taken for the mobile terminal to return to a previous system to a time to scan a succeeding system.

The foregoing and other objects, features, aspects, advantages and embodiments of the present invention may become more apparent from the following detailed description of the present invention when taken in conjunction with the accompanying drawings.

BRIEF DESCRIPTION OF THE DRAWINGS

The accompanying drawings, which are included to provide a further understanding of the embodiments of the invention and are incorporated in and constitute a part of this specification, illustrate arrangements and embodiments of the invention and together with the description serve to explain the principles of the invention.

The following represents brief descriptions of the drawings in which like reference numeral represent like elements and wherein.

DETAILED DESCRIPTION OF PREFERRED EMBODIMENTS

Figure 1:
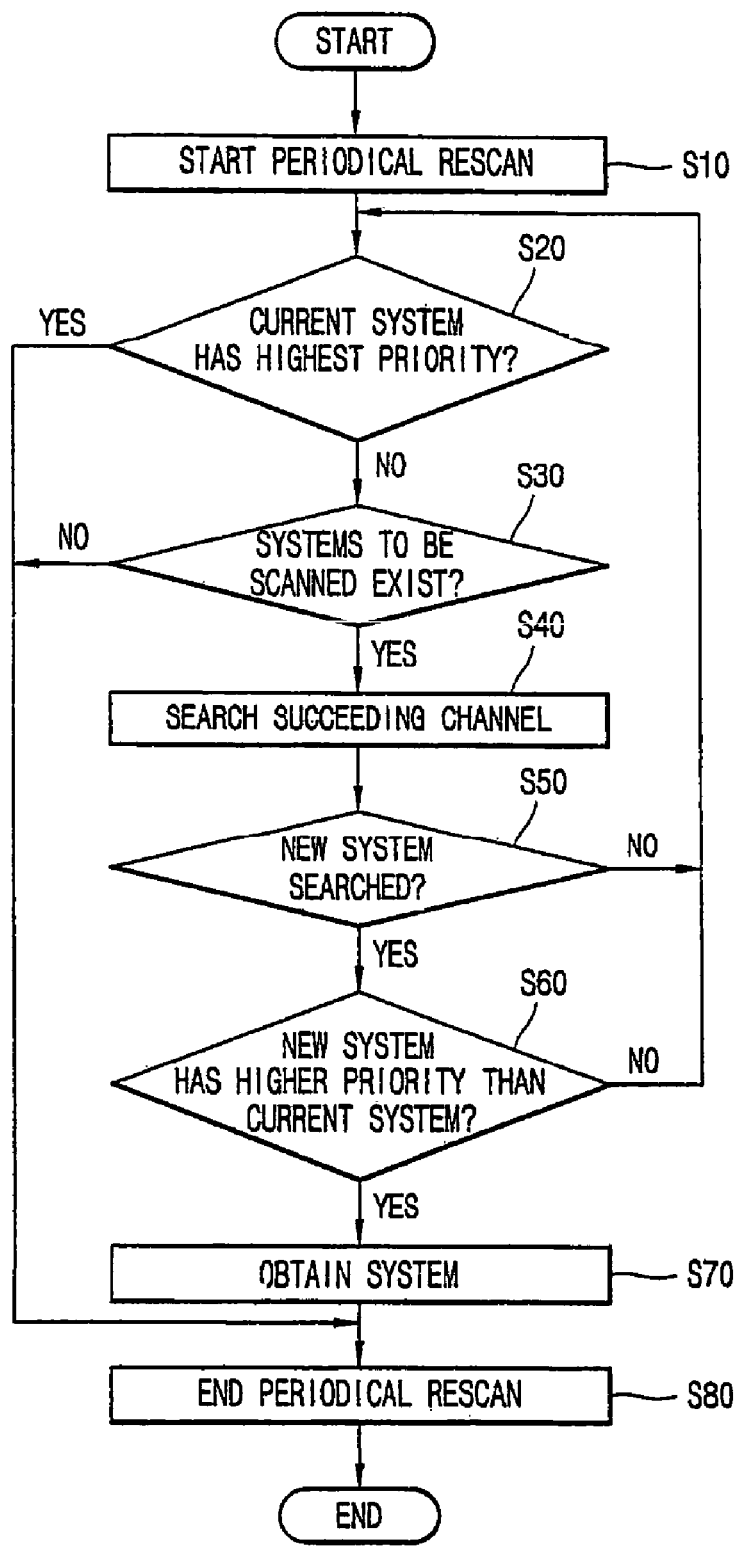
FIG. 1 is a flowchart showing a rescan algorithm of a mobile terminal according to an example arrangement.
Figure 2:
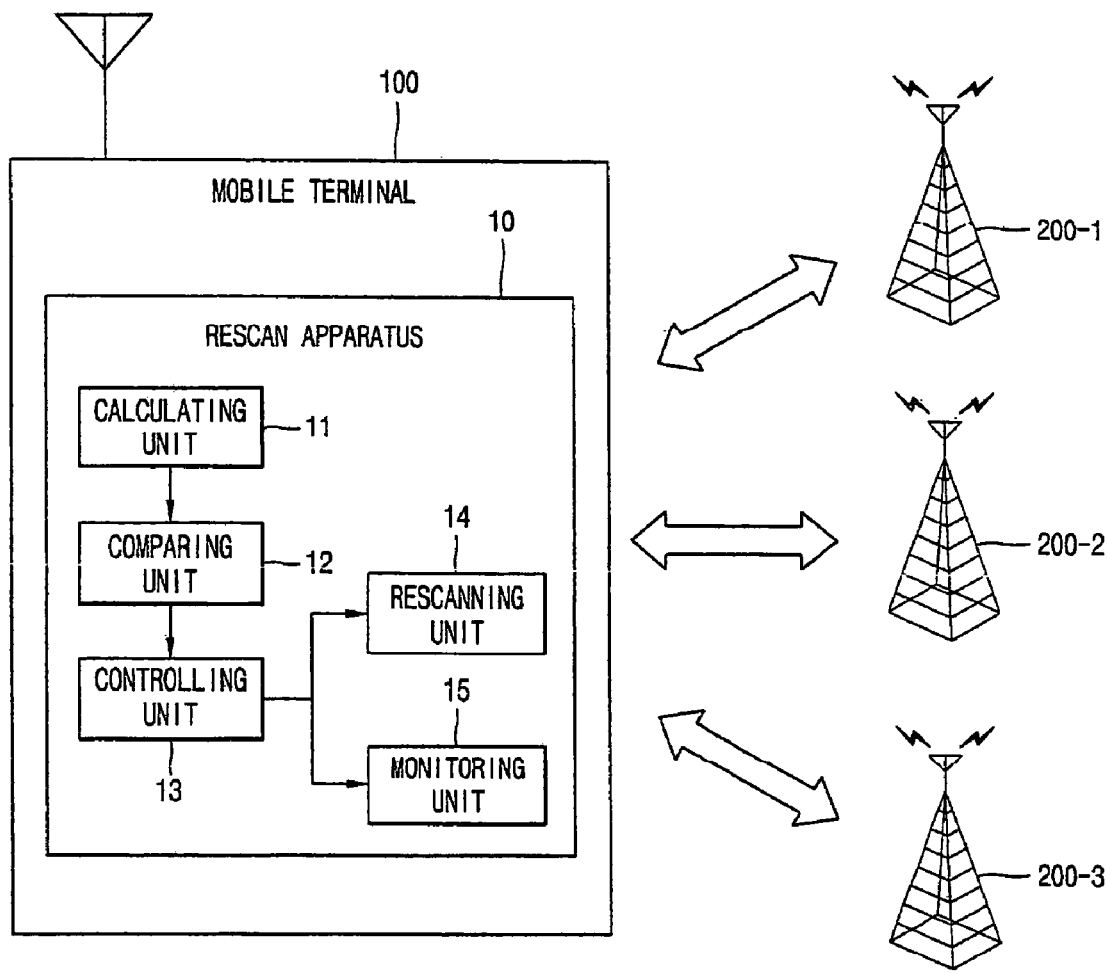
FIG. 2 is a diagram illustrating a rescan apparatus of a mobile terminal and peripheral systems in accordance with an example embodiment of the present invention.

FIG. 2 is a diagram illustrating a rescan apparatus of a mobile terminal and peripheral systems in accordance with an example embodiment of the present invention. Other embodiments and configurations are also within the scope of the present motion.

More specifically, FIG. 2 shows a rescan apparatus 10 of a mobile terminal 100 that includes a calculating unit 11, a comparing unit 12, a controlling unit 13, a rescanning unit 14 and a monitoring unit 15. The calculating unit 11 may calculate a time $T_a$ to monitor a specific slot of the mobile terminal 100 and a time $T_b$ to rescan systems 200-1, 200-2 and 200-3 provided on a scan list of the mobile terminal 100. The systems 200-1, 200-2 and 200-3 may correspond to base stations of a corresponding area. The comparing unit 12 may compare $T_a$ with $T_b$, which are output from the calculating unit 11 and the comparing unit 12 may output a comparison result. The controlling unit 13 may output a control signal to a rescanning unit 14 or a monitoring unit 15 according to the comparison result of the comparing unit 12. The rescanning unit 14 may receive the control signal from the controlling unit 13 and rescan the systems 200-1, 200-2 and 200-3. The monitoring unit 15 may receive the control signal from the controlling unit 13, return to the original system, and monitor the specific slot.

The calculating unit 11 may calculate $T_a$ and $T_b$ according to previously-stored formulas and/or algorithms, for example. The time $T_a$ taken to monitor the specific slot of the mobile terminal 100 may be obtained by subtracting a current slot from a slot to be monitored by the mobile terminal 100. The time $T_b$ to rescan the systems 200-1, 200-2 and 200-3 recorded on the scan list of the mobile terminal 100 may be obtained by adding a time taken for the mobile terminal 100 to return to a previous system to a time taken to scan a succeeding system.

The controlling unit 13 may receive the comparison result from the comparing unit 12, output the control signal to the rescanning unit 14 when $T_a$ is equal to or longer than $T_b$, and output the control signal to the monitoring unit 15 when $T_a$ is shorter than $T_b$.

In an example embodiment of the present invention, the mobile terminal 100 may have the rescan apparatus 10 operate in a slot mode, and calculate $T_a$ and $T_b$ to receive messages while rescanning the plurality of systems 200-1, 200-2 and 200-3 in a corresponding area.

Figure 3:
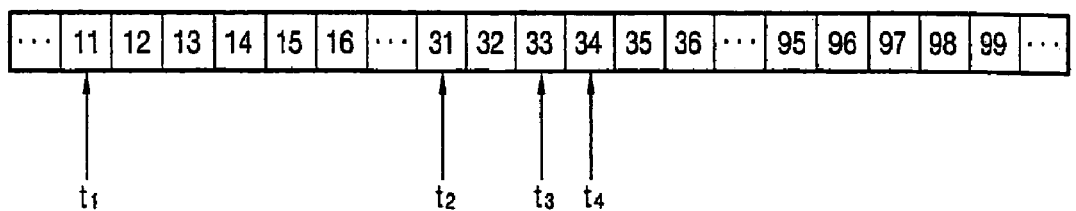
FIG. 3 is a diagram illustrating a page slot to be monitored by the mobile terminal in a slot mode according to an example embodiment of the present invention.
Figure 4:
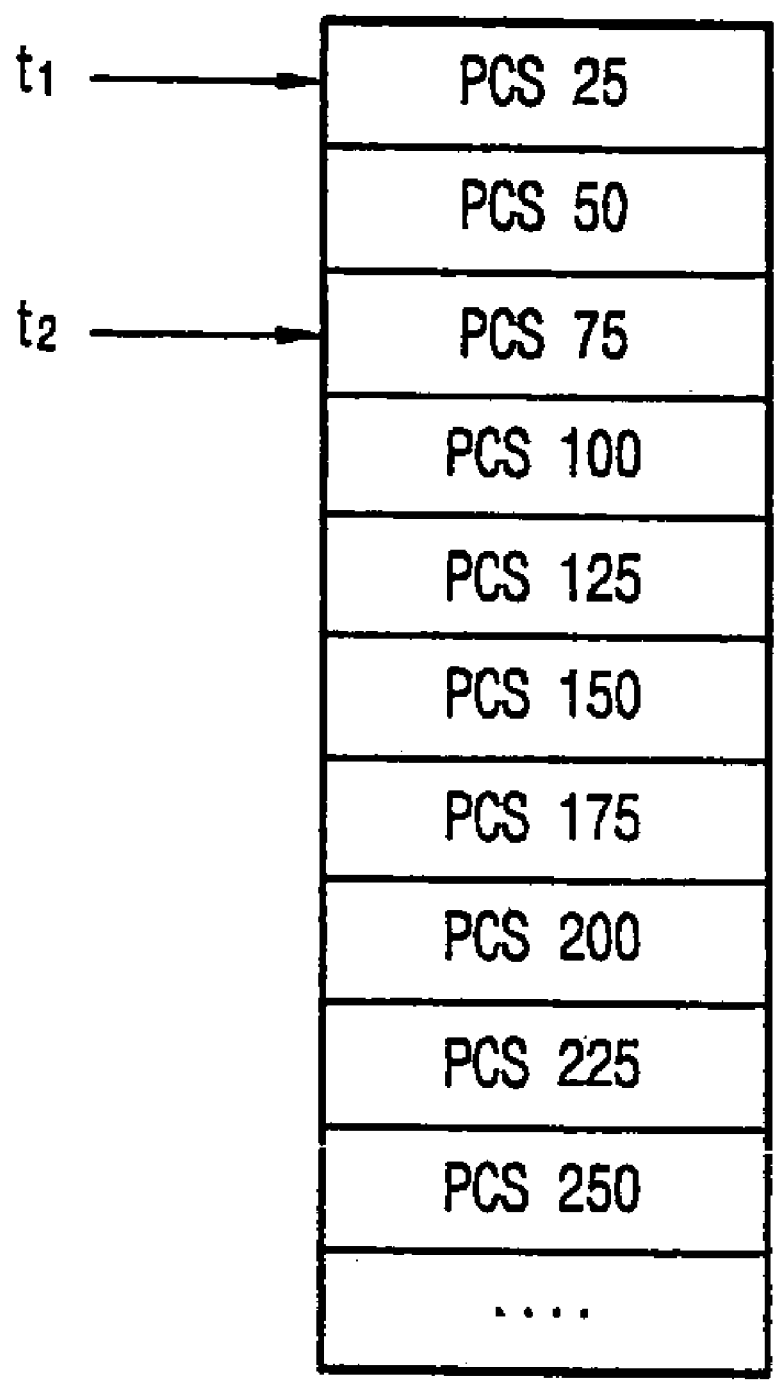
FIG. 4 is an diagram illustrating a scan list of the mobile terminal according to an example embodiment of the present invention.

FIG. 3 is a diagram illustrating a page slot to be monitored by the mobile terminal in a slot mode according to an example embodiment of the present invention. FIG. 4 is a diagram illustrating a scan list of the mobile terminal according to an example embodiment of the present invention. Other arrangements, configurations and embodiments are also within the scope of the present invention.

The mobile terminal in the slot mode may obtain a slot to be monitored according to the International Mobile Station Identity (IMSI). The mobile terminal may monitor only the corresponding slot and maintain a power saving mode except for the monitoring time to reduce power consumption.

As shown in FIGS. 3 and 4, when a slot cycle index is 2, the time taken for the mobile terminal to return to the previous system (i.e., a maximum time taken to tune to another channel is 80 ms) may be identical to one slot time. In addition, the time taken for the mobile terminal to scan the succeeding system (i.e., a maximum time taken to scan a channel) may be 800 ms.

A page slot is 11 and a system to be rescanned by the mobile terminal is a personal communication system (PCS 25) in a current time $t_1$, a page slot may be 31 and a system to be rescanned by the mobile terminal is PCS 75 in a time $t_2$, and a page slot to be monitored by the mobile terminal is 33, the time $T_a$ to monitor the specific slot 33 and the time $T_b$ taken to rescan the systems in $t_1$ and $t_2$ are shown in the following table.

|       | $T_a$              | $T_b$          |
|-------|--------------------|----------------|
| $t_1$ | (33 − 11) * 80 = 1760 | 80 + 800 = 880 |
| $t_2$ | (33 − 31) * 80 = 160  | 80 + 800 = 880 |

As shown in the above table for time $t_1$, $T_a$ is 1760 and $T_b$ is 880 (i.e., $T_a$ is longer than $T_b$). The time taken to rescan the systems recorded on the scan list of the mobile terminal is shorter than the time taken to monitor the specific slot of the mobile terminal. Accordingly, the mobile terminal performs rescan.

However, for time $t_2$, $T_a$ is 160 and $T_b$ is 880 (i.e., $T_a$ is shorter than $T_b$). The time taken to monitor the specific slot of the mobile terminal is shorter than the time taken to rescan the systems recorded on the scan list of the mobile terminal. Therefore, the mobile terminal performs monitoring. The process will now be explained with reference to FIG. 5.

Figure 5:
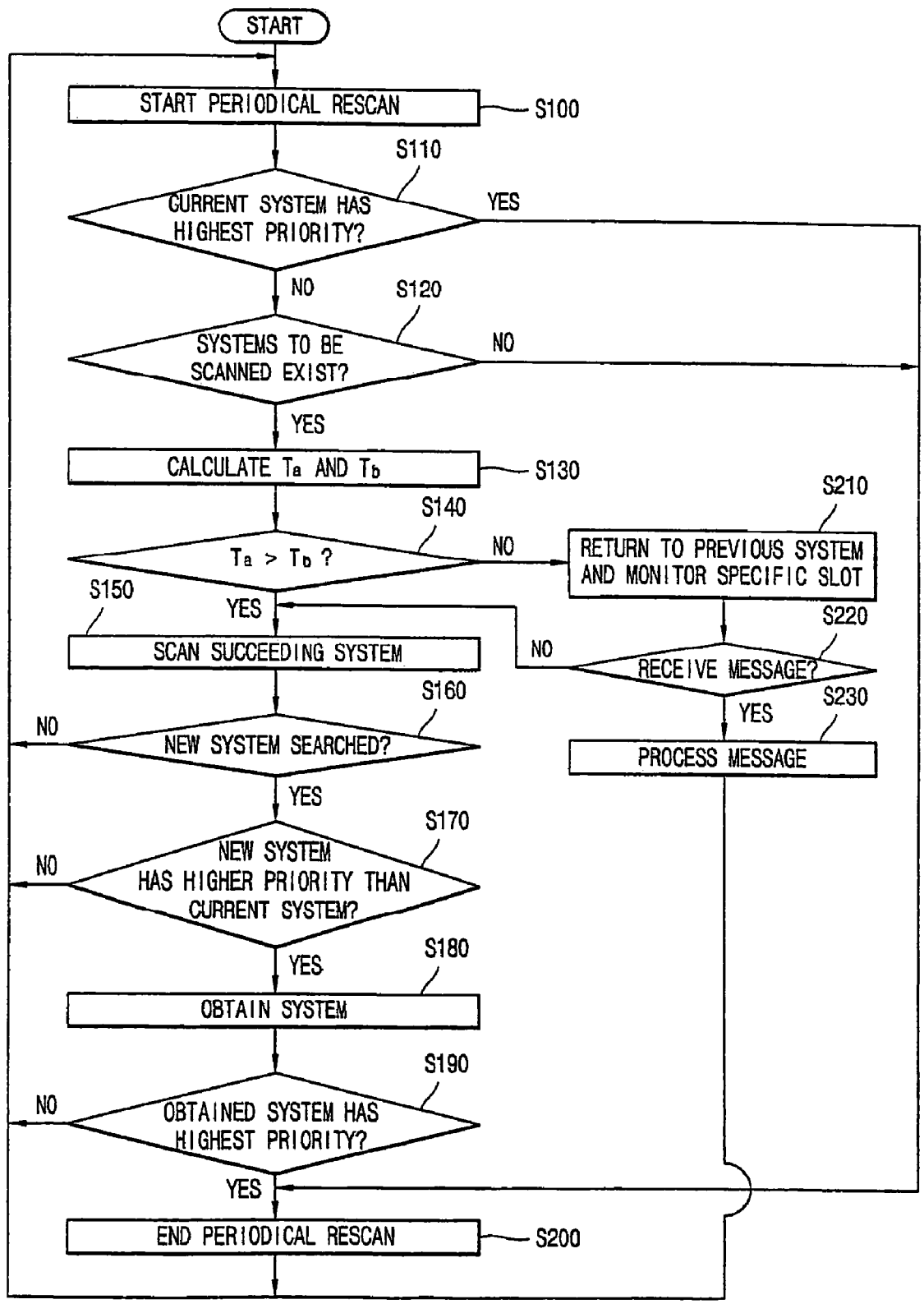
FIG. 5 is a flowchart showing operations of a rescan method of a mobile terminal in accordance with an example embodiment of the present invention.

FIG. 5 is a flowchart showing operations of a rescan method of a mobile terminal in accordance with an example embodiment of the present invention. Other operations, orders of operations and embodiments are also within the scope of the present invention. As shown in FIG. 5, the mobile terminal may stop (or finish) a sleep mode, and periodically rescan systems on a scan list to obtain the system having the highest priority (S100). The mobile terminal may decide whether the current system has the highest priority in a corresponding area (S110). If the current system has the highest priority in the corresponding area, the mobile terminal may maintain the current system and end the rescan process (S200).

If the current system does not have the highest priority in the corresponding area, the mobile terminal may confirm whether systems to be rescanned exist on the scan list (S120). If the systems to be rescanned do not exist, the mobile terminal may maintain the current system and end the rescan process (S200).

If the systems to be rescanned exist on the scan list, the mobile terminal may calculate a time $T_a$ to monitor a specific slot and a time $T_b$ to rescan systems recorded on the scan list (S130). After calculating $T_a$ and $T_b$, the mobile terminal may compare $T_a$ with $T_b$ by checking whether $T_a$ is equal to or longer than $T_b$ (S140).

When $T_a$ is shorter than $T_b$, the mobile terminal may return to the original system and perform monitoring (S210). In the case that the mobile terminal monitors the specific slot, the mobile terminal may confirm whether a message has been newly input (S220). If the message has been newly input, the mobile terminal may process the input message (S230). If not, the mobile terminal may rescan the succeeding system (S150).

On the other hand, when $T_a$ is equal to or longer than $T_b$, the mobile terminal may rescan the other systems on the scan list (S150). When finishing the rescan, the mobile terminal may confirm whether another system has been searched (S160). If another system has not been searched, the mobile terminal may return to the first operation (S100) and repeat the succeeding operation.

If another system has been searched, the mobile terminal may decide whether the searched system has a higher priority than the current system (S170). If the searched system has a lower priority than the current system, the mobile terminal may return to the first operation (100) and perform the succeeding operations. If the searched system has a higher priority than the current system, the mobile terminal may obtain the corresponding system (S180). After obtaining the system, the mobile terminal may confirm whether the obtained system has the highest priority in the corresponding area (S190). If the system has the highest priority in the corresponding area, the mobile terminal may end the rescan process (S200).

However, if the obtained system does not have the highest priority in the corresponding area, the mobile terminal may return to the first operation (S100), and repeat the succeeding operations until the mobile terminal obtains the system having the highest priority.

Although the mobile terminal obtains the system having the highest priority, the mobile terminal may periodically rescan the systems to search and obtain the system having the highest priority in the corresponding area.

The rescan apparatus and method may allow the mobile terminal to monitor the specific slot while periodically rescanning the systems. Therefore, the mobile terminal can receive paging during the rescan process, which results in a higher reliability of service.

In addition, the rescan apparatus and method terminal may prevent call reception failure or message reception delay during the rescan process of the mobile terminal, thereby implementing soft handover and making the user feel more comfortable.

Embodiments of the present invention may be embodied in several forms without departing from the spirit or essential characteristics thereof. It should also be understood that the above-described embodiments are not limited by any of the details of the foregoing description, unless otherwise specified, but rather should be construed broadly within its spirit and scope of the disclosure. Therefore, all changes and modifications that fall within the metes and bounds of the claims, or equivalence of such metes and bounds are therefore intended to be embraced by the appended claims.

What is claimed is:

1. A rescan method of a mobile terminal comprising:
deciding to perform rescans of systems provided on a scan list of the mobile terminal or to return to an original system and monitor a specific slot, the deciding being based on a calculated time to monitor the specific slot and a calculated time to rescan the systems provided on the scan list, wherein the time to monitor the specific slot is calculated based on a time difference between a current slot and another slot to be monitored by the mobile terminal, and wherein the time to rescan the systems is calculated based on a time for the mobile terminal to tune to another channel on the scan list and a time taken for the mobile terminal to scan a channel on the scan list,
wherein when the calculated time to monitor the specific slot of the mobile terminal is longer than the calculated time to rescan the systems on the scan list of the mobile terminal, the mobile terminal decides to rescan the systems on the scan list, and
wherein when the calculated time to monitor the specific slot of the mobile terminal is shorter than the calculated time to rescan the systems on the scan list of the mobile terminal, the mobile terminal decides to return to the original system and monitor the specific slot.

2. The method of claim 1, further comprising operating the mobile terminal in a slot mode.

3. A rescan method of a mobile terminal comprising:
calculating a monitoring time to monitor a specific slot of the mobile terminal, wherein the monitoring time is calculated based on a time difference between a current slot and another slot to be monitored by the mobile terminal;
calculating a rescanning time to rescan systems provided on a scan list of the mobile terminal, wherein the rescanning time is calculated based on a time for the mobile terminal to tune to another channel on the scan list and a time taken for the mobile terminal to scan a channel on the scan list;
comparing the calculated monitoring time and the calculated rescanning time;
rescanning the systems provided on the scan list when the calculated monitoring time is greater than the calculated rescanning time; and
returning to the original system and monitoring the specific slot when the calculated monitoring time is less than the calculated rescanning time.

4. A rescan apparatus of a mobile terminal to periodically rescan systems provided on a scan list of the mobile terminal, or to return to an original system and monitor a specific slot based on a calculated time to monitor the specific slot and a calculated time to rescan the systems, the rescan apparatus comprising:
a controlling unit to perform rescanning of the system and to perform monitoring of the specific slot,
a calculating unit to calculate a time to monitor the specific slot of the mobile terminal and to calculate a time to rescan the systems on the scan list of the mobile terminal, and the calculating unit calculates the time to monitor the specific slot of the mobile terminal by determining a time difference between a current slot and another slot to be monitored by the mobile terminal, and the calculating unit calculates the time to rescan the systems on the scan list of the mobile terminal by adding a time for the mobile terminal to tune to another channel and a time taken for the mobile terminal to scan a channel on the scan list,
a comparing unit to compare the calculated time to monitor the specific slot of the mobile terminal with the calculated time to rescan the systems on the scan list and to provide a comparison result based on the comparison, the controlling unit to receive the comparison result from the comparing unit and the comparing unit to output a control signal,
a rescanning unit to rescan the systems on the scan list when the rescanning unit receives the control signal from the comparing unit, and
a monitoring unit to return to the original system and monitor the specific slot when the monitoring unit receives the control signal from the comparing unit.

5. The apparatus of claim 4, wherein the mobile terminal operates in a slot mode.

6. The apparatus of claim 4, wherein when the comparing unit determines that the calculated time to monitor the specific slot of the mobile terminal is equal to or greater than the calculated time to rescan the systems on the scan list of the mobile terminal, the controlling unit outputs the control signal to the rescanning unit.

7. The apparatus of claim 4, wherein when the comparing unit determines that the calculated time to monitor the specific slot of the mobile terminal is equal to or less than the calculated time to rescan the systems on the scan list of the mobile terminal, the controlling unit outputs the control signal to the monitoring unit.

8. A rescan apparatus of a mobile terminal, comprising:
a calculating unit to calculate a monitoring time to monitor a specific slot of the mobile terminal and to calculate a rescanning time to scan systems on a scan list of the mobile terminal, wherein the monitoring time is calculated by determining a time difference between a current slot and another slot to be monitored by the mobile terminal, and the rescanning time is calculated by adding a time for the mobile terminal to tune to another channel on the scan list and a time taken for the mobile terminal to scan a channel on the scan list;

a comparing unit to compare the calculated monitoring time with the calculated rescanning time and to output a comparison result based on the comparing;

a controlling unit to output a control signal based on the comparison result of the comparing unit;

a rescanning unit to receive the control signal from the controlling unit and to rescan the systems in response to the control signal, wherein the controlling unit receives the comparison result from the comparing unit, and outputs the control signal to the rescanning unit when the calculated monitoring time is greater than the calculated rescanning time; and a monitoring unit to receive the control signal from the controlling unit and to monitor the specific slot in response to the control signal, wherein the controlling unit receives the comparison result from the comparing unit, and outputs the control signal to the monitoring unit when the calculated monitoring time is less than the calculated rescanning time.

* * * * *